May 9, 1967  W. T. SULLIVAN  3,318,439
CONVEYOR SYSTEM
Filed April 12, 1965  3 Sheets-Sheet 1
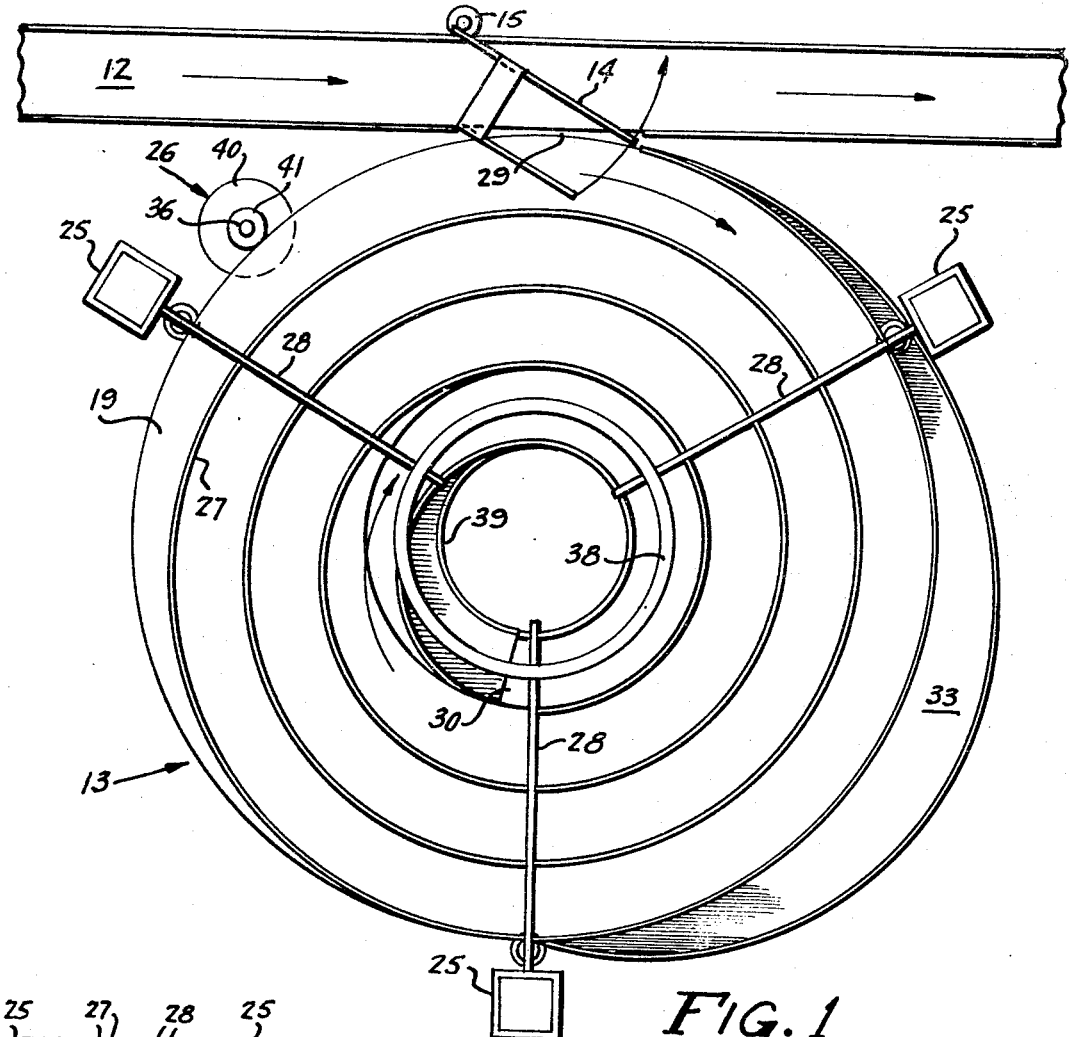
FIG. 1
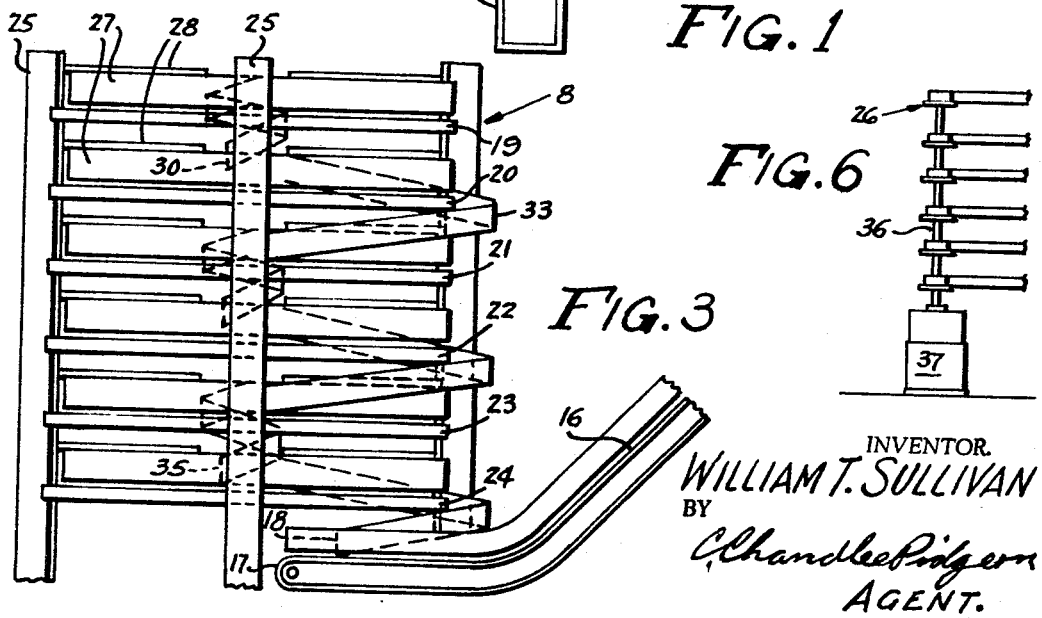
FIG. 3
FIG. 6
INVENTOR.
WILLIAM T. SULLIVAN
BY
Chandlee Pidgeon
AGENT.

INVENTOR.
WILLIAM T. SULLIVAN
BY
C. Chandlee Pidgeon
AGENT.

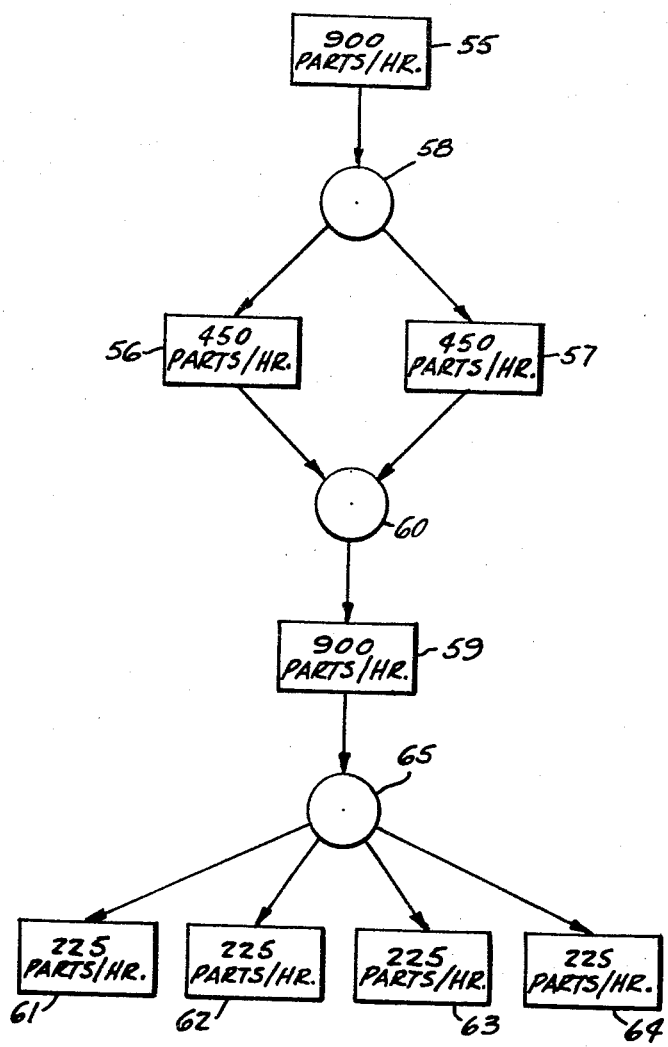
INVENTOR.
WILLIAM T. SULLIVAN
BY
C. Chandler Pidgeon
AGENT.

3,318,439
CONVEYOR SYSTEM
William T. Sullivan, Oxford City, Ohio, assignor to Kornylak Corporation, Hamilton, Ohio, a corporation of New Jersey
Filed Apr. 12, 1965, Ser. No. 447,306
7 Claims. (Cl. 198—75)

The invention relates to a conveyor system and method and more particularly to a system and method for supplying parts, which are the product of a first machine to another machine or machines.

The use of conveyor systems for supplying parts from a first machine to a second machine are well known. However, when it becomes necessary to slow or stop the first machine the output of the other machine is curtailed, and if it is necessary to slow or stop the second machine the parts supplied by the first machine cannot be used and the overproduction must be eliminated or stored.

It is an object of this invention to provide an automatic live storage conveyor system which can store the overproduction of the first machine and when the production of the first machine is insufficient due to slowdown or shutdown the system can supply the second machine with parts from storage.

In accordance with the invention a direct or main conveyor is used to convey the product of the first machine to the second machine. If the production of the first machine becomes too great for the second machine, such as would occur if the second machine slowed down or stopped, a diverter is manually or automatically operated to divert the product from the main conveyor to the live storage conveyor. When the second machine is returned to normal operation the diverter is disabled to allow the main conveyor to convey the product to the second machine. When it becomes necessary to slow or stop the first machine, the product is moved from the live storage conveyor to the main conveyor to supply the second machine.

In a system wherein several machines may be in line but may too closely spaced to permit live storage on the main line conveyor for a duration, up to tool change time, a live storage unit of this invention can be used. The design of the live storage conveyor will be adapted to machine requirements and space between machines.

The invention will be understood by reading the following description in conjunction with the accompanying drawings wherein:

FIG. 1 is a plan view of one element of the live storage and conveying means;

FIG. 3 is an elevation of a stacked series of units;

FIG. 6 is a fragmentary view showing one form of drive means for the conveyor discs;

FIG. 7 is a diagram showing a suggested set up of the live storage units and cooperating machine; and FIG. 8 is a further showing of suggested uses of the storage devices.

Figure 2:
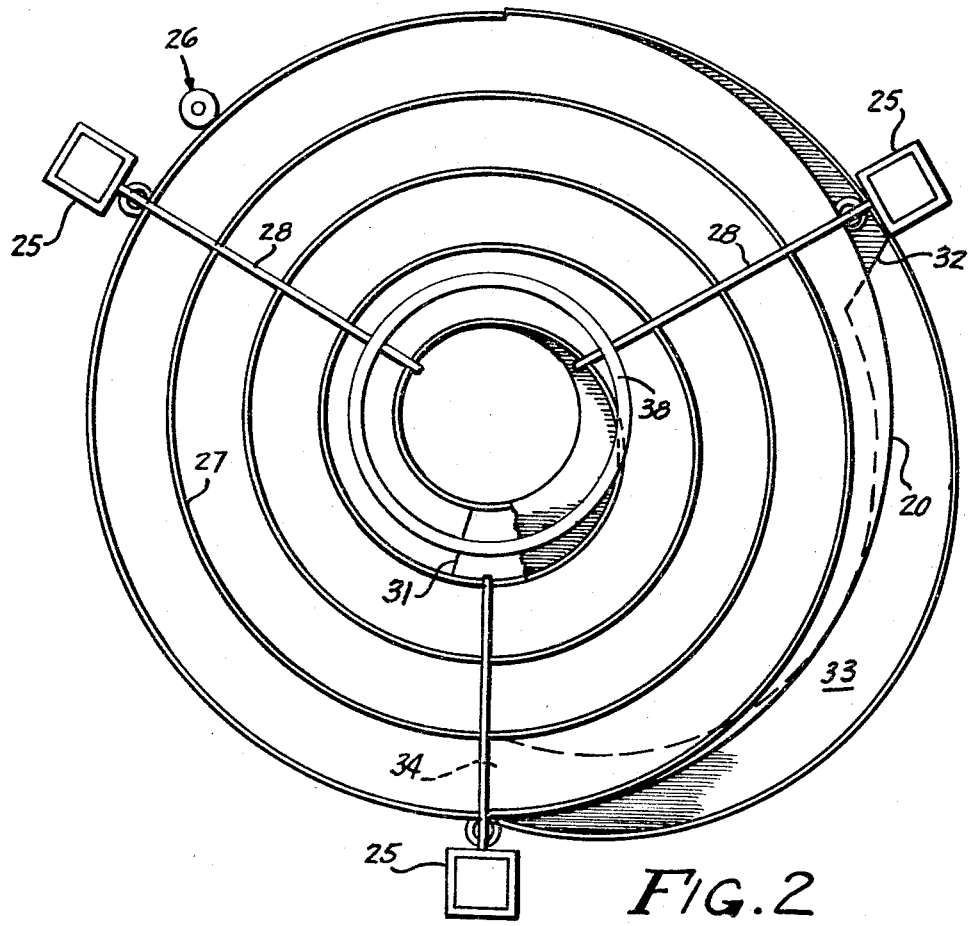
FIG. 2 is a similar view of an element next below that shown in FIG. 1.
Figure 4:
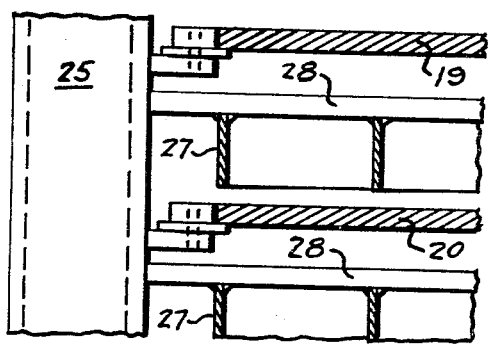
FIG. 4 is a fragmentary view partly in section of the units shown in FIGS. 1 and 2.

A first machine 10 is connected to a second machine 11 by a main conveyor 12 to supply articles which are the product of the first machine to the second machine for further operation thereon. Adjacent the main conveyor 12 is a storage or accumulator conveyor 13 in which the articles being moved from the first machine can be stored or accumulated for future use. A diverter 14 is mounted to swing across the main conveyor to divert any articles thereon to the storage conveyor. The diverter is operated by a rotary solenoid 15 which is energized by a suitable signal from the second machine activated by shut down for retooling, absence of parts or excess parts on conveyor 12.

A second conveyor 16 has a loading end 17 adjacent the discharge chute 18 of the storage conveyor and is arranged to convey articles to the main conveyor for transfer to the second machine 11.

The storage conveyor comprises a plurality of discs 19, 20, 21, 22, 23, 24 rotatably mounted on a frame having legs 25, equally spaced about the discs, three being shown. A plurality of rollers 26, equally spaced around the discs support them for rotation. Each disc has fixedly mounted thereabove a spiral guide 27 comprising a spring strip secured to bars 28 which are secured to the posts 25 and which bars extend radially, to form the desired spiral. The guides above discs 19, 20, 21, 22, 23 and 24 are alternately spirals of one hand, i.e., right hand and the other hand, i.e., left hand. The articles which are diverted from the main conveyor 12, are moved into the entrance end 29 of the first spiral guide formed between the first and second turns of the strip and due to the rotation of disc 19 are moved inwardly to the inner end of the guide where the articles are received in a guide or chute 30 which conveys the articles by gravity to the inner end of the spiral guide 31 located above disc 20. Due to the fact that this guide is a spiral of opposite hand rotating disc 20 will move the article outwardly to the end 32 of this guide. Here a guide or chute 33 conveys the article by gravity to the entrance end 34 of the spiral guide located above the outer periphery of disc 21. The spiral guides are thus arranged in series whereby an article entering at 29 will be moved through each guide in turn and will emerge at 35 which is the exit end of the last spiral guide. Discs 19, 21, 23, etc., are annular, i.e., they have a central opening through which the chutes, such as 30 project. Discs 20, 22, 24, etc., are solid discs onto which articles from chutes 30 drop.

In production the live storage conveyor 13 is composed of one or more pairs of discs such as 19, 20, 21, 22, etc. Thus if it is found that a given number of pairs is insufficient, the capacity can be increased by adding one or more pairs vertically.

The discs 19, 20, etc., are driven by individual wheels 26 secured to a shaft 36 and bearing against the peripheries of the discs. The shaft is driven by any suitable means, such as the motor 37.

The bars 28 are connected adjacent their inner ends to a ring 38. The inner end of the spiral 27 merges into the chute 30 which extends into the opening 39.

The wheels 26 comprise disc portions 40 and hub portions 41. The discs 19, 20, etc., rest on the disc portions 40 and the hub portions 41 prevent lateral displacement. One shaft 36 may be powered and the other annularly spaced wheels may be idlers. Other drive means may be used without departing from the spirit of this invention. Only a single type spiral 27 need be provided, as the reverse movement of parts is accomplished by turning the spiral upside down.

A control center 45 is provided on the machine 11 to control operation of the live storage conveyor. Such control center could include scanning or sensing devices for detecting absence of parts on the conveyor 12, or the presence of too many parts. In the latter case, diverter 14 will be operated to divert parts to the storage conveyor. When operation is normal, conveyor 12 supplies machine 11 while the live storage conveyor 13 is idle. If machine 10 is shut down for retooling or repair, the live storage conveyor 13 is either manually operated or automatically operated by such shutdown to supply parts to machine 11. When machine 11 is shut down, parts are diverted to the live storage conveyor 13.

Figure 5:
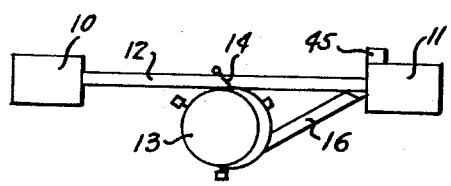
FIG. 5 is a diagrammatic view of the system.

FIG. 5 shows only one example of the use of a live storage conveyor. Further examples of possible uses are shown in FIGS. 7 and 8. On FIG. 7, machine 50 produces, for example, 900 parts an hour. If retooling time be 10 minutes, the storage conveyor 51 must handle the parts required in that time plus a cushion of about 10%. This comes to 165 parts. Then if machine 52 is shut down, an additional storage capacity of 165 parts is required. Thus a live storage conveyor 51 would be designed to hold 200 parts on a disc 19, and therefore, in this example two discs 19, 20 would be required. If the parts operated on by machine 52 are to go to another machine 53, then a live storage conveyor 54 similar to 51 is provided and operates in a like manner.

FIG. 8 illustrates another possibility, where machine 55 produces 900 parts an hour, and the production is divided and sent to two machines 56, 57 operating on 450 parts per hour. In this case, where only one machine shuts down at a time, the storage conveyor 58 need have only half the capacity of the storage conveyor 51. However, if the machines 56 and 57 both shut down at one time the storage conveyor 58 needs the same capacity as the storage conveyor 51.

The products of machines 56 and 57 are combined and operated on by machine 59. A storage conveyor 60 like storage conveyor 51 is located ahead of machine 59. The product of machine 59 may be divided and passed to four machines 61, 62, 63 and 64. In this case the storage conveyor 65 will be designed for a capacity to accommodate maximum shutdown of machines 61, 62, 63 and 64. In this case it would be like storage conveyor 51. In the operation of the systems according to FIGS. 7 and 8, the diagrammatic showings assume necessary main conveyors and controls for the various elements of the system. As these are not basic elements of the invention, further description is deemed unnecessary. Other variations of the disclosed system will become apparent to those skilled in the art.

Having described my invention in several aspects, I desire it to be understood that modifications and changes may be made within the skill of the art and the scope of the appended claims.

I claim:

1. A conveying system comprising a main conveyor for conveying articles from a first machine to a second machine, live storage conveyor means adjacent the main conveyor for storing articles from the first machine, means for diverting articles from the main conveyor during operation of the said main conveyor to the live storage conveyor, and means responsive to commands from the second machine for conveying articles from the live storage conveyor to the main conveyor.

2. A conveying system comprising a main conveyor for conveying articles from a first machine to a second machine, live storage conveyor means adjacent the main conveyor for storing the articles from the first machine, means operated by commands from the second machine for diverting articles from the main conveyor to the live storage conveyor, and means responsive to commands from the second machine for conveying articles from the live storage conveyor to the main conveyor.

3. The structure as defined in claim 2 wherein the means commanding an operation of the storage means is a control center having suitable sensing devices.

4. The structure as defined in claim 3 wherein the means operating on command to divert articles from the main conveyor to the live storage conveyor is a diverter operating across the main conveyor.

5. The structure as defined in claim 3 wherein the the means operating on command from the second machine to supply articles from the live storage conveyor comprises a conveyor accepting articles from the live storage conveyor and delivering them to the main conveyor adjacent to the second machine.

6. A live storage conveyor comprising supporting means, means rotatably mounting a plurality of discs one above the other on the supporting means, spiral guides fixedly mounted on the supporting means one spaced above each disc with alternate guides being spirals of one hand and the intermediate guides being spirals of the opposite hand, means for rotating said discs all in the same direction by engagement with their peripheries, and guide means connecting the spiral guides in series.

7. The structure as defined in claim 6 wherein the discs are arranged in pairs, the upper one of a pair being annular and having a central opening and wherein the means connecting the spiral guides in series includes a chute passage through the central opening.

References Cited by the Examiner

UNITED STATES PATENTS

| | | | |
|---|---|---|---|
| 1,428,716 | 9/1922 | Smith et al. | 198—135 X |
| 2,158,069 | 5/1939 | Grover | 198—37 |
| 2,278,434 | 4/1942 | Fahey | 198—209 |
| 2,873,020 | 2/1959 | Kay | 198—103 |

EVON C. BLUNK, *Primary Examiner.*

SAMUEL F. COLEMAN, *Examiner.*

R. J. HICKEY, *Assistant Examiner.*